United States Patent
Nguyen et al.

Patent Number: 5,834,564
Date of Patent: Nov. 10, 1998

[54] PHOTOCONDUCTOR COATING HAVING PERFLUORO COPOLYMER AND COMPOSITION FOR MAKING SAME

[75] Inventors: Khe Nguyen, Los Altos; Sivapackia Ganapathiappan, Fremont, both of Calif.

[73] Assignee: Hewlett-Packard Company, Palo Alto, Calif.

[21] Appl. No.: 641,125

[22] Filed: Apr. 30, 1996

[51] Int. Cl.⁶ .......................... C08F 8/00; C08F 220/22; C08F 220/20
[52] U.S. Cl. .................... 525/326.3; 525/326.4; 525/374
[58] Field of Search .................. 525/326.3, 326.2, 525/326.4

[56] References Cited

U.S. PATENT DOCUMENTS

| | | |
|---|---|---|
| 3,810,874 | 5/1974 | Mitsch et al. . |
| 4,321,404 | 3/1982 | Williams et al. ................ 560/115 |
| 4,565,714 | 1/1986 | Koshar ................ 427/54.1 |
| 4,567,073 | 1/1986 | Larson et al. ................ 428/40 |
| 4,614,667 | 9/1986 | Larson et al. ................ 427/54.1 |
| 4,772,526 | 9/1988 | Kan et al. ................ 430/58 |
| 4,946,936 | 8/1990 | Moggi et al. ................ 528/392 |
| 4,996,125 | 2/1991 | Sakaguchi et al. ................ 430/66 |
| 5,026,606 | 6/1991 | Isbrandt et al. ................ 428/421 |
| 5,075,106 | 12/1991 | Goldenberg ................ 526/247 |
| 5,212,016 | 5/1993 | Mascia et al. ................ 428/422 |
| 5,268,405 | 12/1993 | Ojakaar et al. ................ 524/366 |
| 5,300,587 | 4/1994 | Mascia et al. ................ 525/359.3 |
| 5,300,683 | 4/1994 | Bierschenk et al. ................ 562/582 |
| 5,439,980 | 8/1995 | Yutani et al. ................ 525/276 |
| 5,463,006 | 10/1995 | Abusieme et al. ................ 526/247 |

Primary Examiner—Christopher Henderson
Attorney, Agent, or Firm—Philip S. Yip

[57] ABSTRACT

A photoconductor coating which is a cross-linked product of a copolymer is disclosed. The copolymer is a polymerization reaction product of reactant monomers comprising three types of monomers. The reactant monomers include from 0.1 to 20 mole percent of one or more first monomers on the reactant monomers, from 0.1 to 20 mole percent of one or more second monomers on the reactant monomers, and from 0.1 to 80 mole percent of one or more third monomers on the reactant monomers. The first monomers has the formula

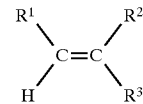

wherein $R^1$, $R^2$ each is selected from the group consisting of hydrogen, halogen, alkyl, phenyl, phenylalkyl, and alkylphenyl in which alkyl has 1 to 4 carbon atoms and is linear, $R^3$ is selected from the group consisting of hydrogen, alkyl, phenyl, phenylalkyl, alkylphenyl, biphenyl, —$COOR^5$, and —$CONHR^6$; $R^5$ and $R^6$ each is selected from the group consisting of hydrogen, fluorine, alkyl, fluoroalkyl, chloroalkyl, alkyl, phenyl, phenylalkyl, and alkylphenyl in which alkyl has 1 to 4 carbon atoms and is linear. The second monomers has the formula

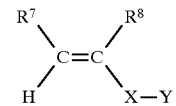

wherein $R^7$, $R^8$ each is selected from the group consisting of hydrogen, alkyl, phenyl, phenylalkyl, and alkylphenyl in which alkyl has 1 to 4 carbon atoms and is linear, X is a bivalent linking group, and Y is selected from the group consisting of —OH, —NCO, —COR (where R is —H, —OH, alkyl, aryl), —NHR (where R is —H, —OH, alkyl, aryl), anhydride group, and epoxy group. The third monomers are perfluoropolyethers having the formula $Z^1Q^1(CF_2CF_2O)_m(CF_2O)_nQ^2Z^2$ wherein m is from about 1 to about 10,000, n is from 1 to 10,000, $Q^1$, $Q^2$ each is a polyvalent linking group, $Z^1$ and $Z^2$ each has the formula

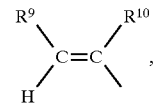

and $R^9$, $R^{10}$ each is selected from the group consisting of hydrogen, alkyl, phenyl, phenylalkyl, and alkylphenyl in which alkyl has 1 to 4 carbon atoms and is linear. The copolymer has a molecular weight of from 1,000 to 500,000.

3 Claims, 2 Drawing Sheets

PHOTOCONDUCTOR COATING HAVING PERFLUORO COPOLYMER AND COMPOSITION FOR MAKING SAME

FIELD OF THE INVENTION

The present invention relates to electrophotography. More particularly, this invention relates to a coating on an electrophotographic imaging photoconducting element which is used for transferring imaging particles to a substrate.

BACKGROUND

With the rapid development of computers, especially personal computers, better equipment and methods of printing data output from computers are becoming more important. A well received method of printing such data output is electrophotographic imaging. In electrophotographic imaging, electrostatic latent-image charge patterns are formed on photoconductive elements, or photoconductors (which generally have an electrically conductive substrate on which colorant particles can deposit). A developer is used to develop a latent image into a visible toner image by depositing small colorant particles on the photoconductive elements according to the charge patterns. The toner images are then transferred to paper, thereby forming prints on paper. In electrophotography, super fine toner particles can be provided in a liquid toner. The liquid toner is a component of a liquid developer, and is composed of sub-micron toner particles dispersed in a hydrocarbon carrier liquid. For better quality prints, generally, liquid toners (i.e., toners that contain a carrier liquid) are preferred over dry toners.

When the toner particles are transferred to a piece of paper, some of the liquid is carried over to the paper as well. The liquid carriers in liquid toners (which can be used to develop the electrophotographic image), however, are generally hydrocarbon liquids and are undesirable for office or home use. It would appear that to minimize the carried-over liquid (to the paper), the carrier liquid should be removed before the transfer step. However, removing the liquid from the particles from the liquid toner increases the adhesion force between such "semi-dry" toner colorant particles and the surface on the photoconductive element and results in lower transfer efficiency. Thus, for better quality prints, generally, liquid toners (i.e., toners that contain a carrier liquid) are preferred over dry developers (or toners).

It is known that a low surface adhesion material such as polydimethyl siloxane (PDMS) can be used to reduce the surface energy and made the transfer of material between surfaces easier. However, PDMS has a poor resistance to hydrocarbon liquids in liquid toners. The frequent exposure of PDMS to the hydrocarbon liquid results in permanent damage of the low energy surface and may eventually lead to the total destruction of the surface coating layer made of PDMS. Various patents have described the use of low surface energy materials containing perfluoropolyethers (e.g., U.S. Pat. No. 4,565,714 (Koshar), U.S. Pat. No. 4,567,073 (Larson et al.), and U.S. Pat. No. 4,614,667 (Larson et al.)). However, these patents involve applications in adhesive tapes and are unrelated to electrophotographic imaging.

U.S. Pat. No. 4,772,526 (Kan et al.) describes a reusable electrophotographic imaging element having a photoconductive surface layer in which the binder resin has a block copolyester or copolycarbonate with a fluorinated polyether block. The copolymer is a thermoplastic resin rather than crosslinking component and is not suitable for reusable purpose in liquid toner because the thermoplastic resins tend to swell in hydrocarbon liquid. Furthermore, the electrophotographic imaging element describe the combination of the ester and carbonate components as major components of the coating. Thus, such materials are not expected to have low surface adhesion (because the carbonyl group in the ester or polycarbonate tends to increase adhesion). Thus, such materials are more suitable for dry powder, whose particle size is generally above 3 μm and is relatively loosely bound to the photoconductor surface compared to the smaller particles of a liquid toner developer. When the average size of toner particles becomes smaller, the particles tend to adhere more strongly to the surface. Liquid toner particles exhibit an average particle size of sub-micron range. If a film-forming liquid toner is used, the toner particles tend to adhere to each other and to the substrate strongly. This adhesion becomes even stronger with the evaporation of the carrier liquid.

U.S. Pat. No. 4,996,125 (Sakaguchi et al.) describes an electrophotographic photoreceptor containing a fluorine-lubricating-agent layer in which the lubricating agent is selected from perfluoroalkyl polyether or its derivatives. However, a perfluoropolyether of this type tends to deteriorate in wet environment due to low level of crosslinking. Also, the perfluoro component tends to give rise to low dielectric constant. This would result in high residual voltage due to the surface charge trapping effect. Such residual charges can build up quickly and cause a constant loss of the developed image with repeated cycles.

It is generally known that materials such as PDMS and perfluoropolyether/ polycarbonate are very much compatible with hydrocarbon liquids (such as those used in liquid toners) and exhibit excellent wetting by them. Such good wetting characteristics increase the difficulties of the removal of the carrier liquid from the toner image before transferring to paper, as well as slow down the printing process.

The present invention meets the need in the prior art by providing a photoconductor coating with low enough surface energy so that the super fine toner particles such as those found in the "dried" liquid toners (submicron or less) can be transferred off the coating.

SUMMARY OF THE INVENTION

The present invention provides a surface coating of a photoconductor having low surface energy adequate for transfer of a fine particle that tend to adhere strongly to a photoconductor surface. The surface coating has a copolymer which is a polymerization reaction product of reactant monomers. The monomers include from 0.1 to 20 mole percent of one or more first monomers on the reactant monomers, from 0.1 to 20 mole percent of one or more second monomers on the reactant monomers, and from 0.1 to 80 mole percent of one or more third monomers on the reactant monomers. The first monomers have the formula

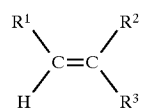

wherein $R^1$, $R^2$ each is selected from the group consisting of hydrogen, halogen (preferably fluorine or chlorine), fluoroalkyl, chloroalkyl, alkyl, phenyl, phenylalkyl, and alkylphenyl, in which, preferably, alkyl has 1 to 4 carbon atoms and preferably is linear, $R^3$ is selected from the group consisting of hydrogen, halogen (preferably fluorine or chlorine), alkyl, phenyl, phenylalkyl, alkylphenyl, biphenyl, —COOR$^5$, and —CONHR$^6$, wherein R$^5$ and R$^6$ each is selected from the group consisting of hydrogen, fluorine, alkyl, fluoroalkyl, chloroalkyl, alkyl, phenyl, phenylalkyl, and alkylphenyl, in which alkyl preferably has 1 to 4 carbon atoms and is linear.

The second monomers have the formula

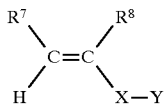

wherein R$^7$, R$^8$ each is selected from the group consisting of hydrogen, alkyl, phenyl, phenylalkyl, and alkylphenyl in which alkyl preferably has 1 to 4 carbon atoms and is linear, X is a bivalent linking group, and Y is a reactive functional group selected from the group consisting of —OH, —NCO, —COR (where R is —H, —OH, alkyl, aryl), —NHR (where R is —H, —OH, alkyl, aryl), anhydride group, and epoxy group.

The third monomers are perfluoropolyethers having the formula Z$^1$Q$^1$(CF$_2$CF$_2$O)$_m$(CF$_2$O)$_n$Q$^2$Z$^2$ wherein m is from about 1 to about 10,000, n is from about 1 to about 10,000, Q$^1$, Q$^2$ each is a polyvalent linking group, and Z$^1$ and Z$^2$ each has the formula

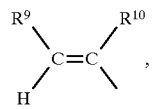

where R$^9$, R$^{10}$ each is selected from the group consisting of hydrogen, alkyl, phenyl, phenylalkyl, and alkylphenyl in which alkyl has 1 to 4 carbon atoms and is linear; wherein the copolymer has a molecular weight of from 1,000 to 500,000. The copolymer of the present invention can be used to make a photoconductor coating. Such a coating will have a low surface energy to shed carrier liquid from a liquid toner in electrophotographic imaging to reduce the amount of carrier liquid carry-over during the transfer of colorant particles to paper. The surface energy can be less than 30 dyne/cm. The photoconductor coating is resistant to liquid hydrocarbon and resists mechanical wear. Furthermore, the copolymers of the present invention are adequately soluble in alcohol to facilitate the coating process on photoconductors. After being coated on the photoconductor and cured, the coating becomes thermoset (crosslinked) and is no longer soluble in commonly used solvents such as hydrocarbon liquids. This coating is also non-wetting with respect to hydrocarbon liquids so that a hydrocarbon liquid can be removed more effectively from the coating before the transfer step. The coating is also long-lasting (both electrical, chemical, and mechanical). Being resistant to chemical and mechanical wear, the photoconductor coating makes multiple use possible. The copolymer, which contains perfluoropolyether, is selectively combined to keep the dielectric constant of the coating about the same as that of the photoconductor and to maintain the cyclic stability of the photoconductor. Thus, a photoconductor coating of the present invention can maintain good contrast after many cycles of use.

BRIEF DESCRIPTION OF THE DRAWING

The following figures which show the embodiments of the present invention are included to better illustrate the present invention. In these figures, like numerals represent like features in the several views and the structures are not drawn to scale for clarity.

DETAILED DESCRIPTION OF THE INVENTION

Figure 1:
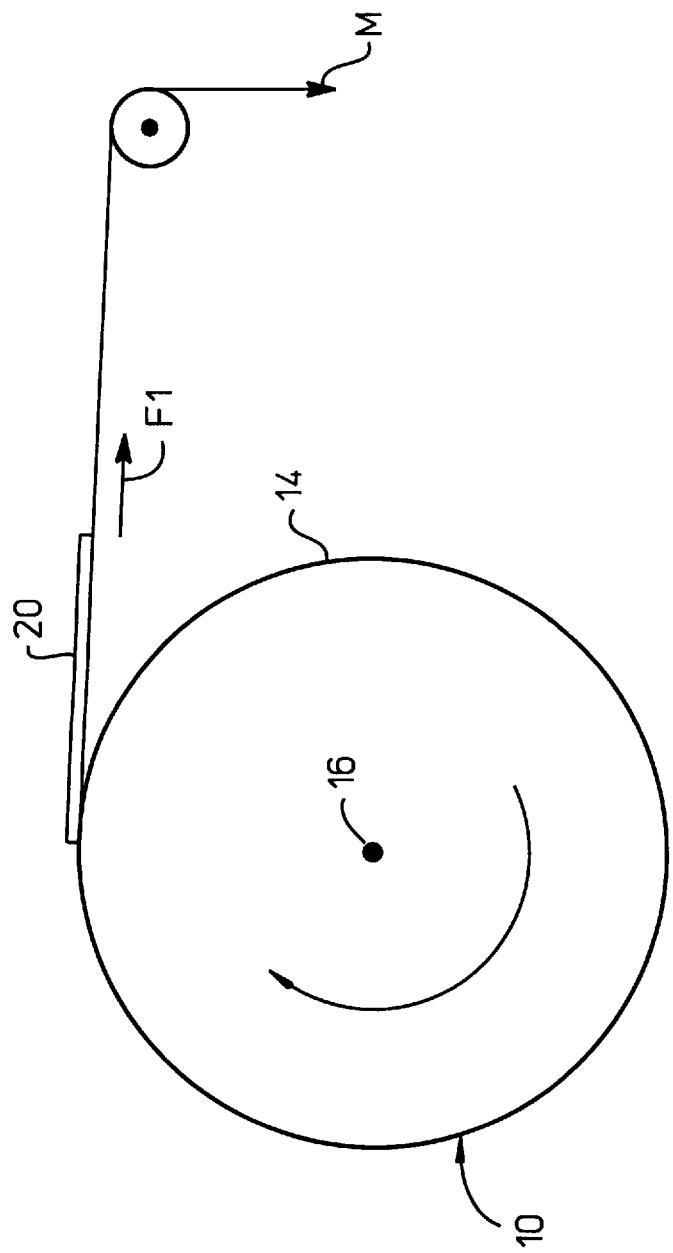
FIG. 1 is a schematic representation of a mechanism for measuring release property of a surface (e.g., a coating according to the present invention).

The composition for forming the photoconductor coating according to the present invention comprises monomers for forming a copolymer that is adequately soluble in a solvent such that the copolymer can be coated on a photoconductor. When the copolymer molecules are cross-linked to form a photoconductor coating (i.e., a top coating on a photoreceptor), such a coating will not be substantially wettable (adherable) by a carrier fluid of a liquid toner.

The copolymer is an polymerization product of reactant monomers including three types of monomers M1, M2, and M3. As used herein, the term "copolymer" refers to a polymer produced by polymerization of two or more dissimilar monomers.

The first type of monomers, M1, is a vinylic monomer which controls the electrical properties of the surface of the photoconductor. In other words, this monomer component is capable of controlling the dielectric constant and thus the surface resistivity of the photoconductor. As will be described later, the low surface energy and non-wetting component, M3, is selected from the group of chemicals having perfluoropolyether which, in general, contributes to the low dielectric constant of the material. This low dielectric constant can be modified or adjusted by a higher dielectric constant molecule, such as monomer component M1, chemically bonded in the copolymer.

A monomer of the first type of monomers (M1) has an ethylenically unsaturated end group such that this end group can join (i.e., covalently bond) with another ethylenically unsaturated end group of another monomer (which can, but not necessarily, be different from M1). The M1 monomer also has another end group that is selected to impart a desired mechanical resistivity (such as wear resistance, flexibility, and the like) and chemical resistivity (chemical resistance) to the resulting photoconductor coating. Preferably this resistivity-controlling moiety is a hydrophobic moiety that reduces the effect of water or moisture adhesion on the photoconductor coating. Generally, this monomer has a molecule weight of about 70 to about 5,000 Daltons.

M1 has the formula HR$^1$C=CR$^2$R$^3$, which in two-dimensional representation is

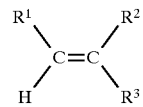

wherein R$^1$, R$^2$ each is selected from the group consisting of hydrogen, halogen (preferably fluorine or chlorine), fluoroalkyl, chloroalkyl, alkyl, phenyl, phenylalkyl, and alkylphenyl. In these groups, preferably, alkyl has 1 to 4 carbon atoms and preferably is linear (i.e., the alkyl in the alkylphenyl or phenylalkyl also is 1 to 4 carbon atoms and is linear). $R^3$ is selected from the group consisting of hydrogen, halogen (preferably fluorine or chlorine), alkyl, phenyl, phenylalkyl alkylphenyl, biphenyl, —$COOR^5$, and —$CONHR^6$, wherein $R^5$ and $R^6$ each is selected from the group consisting of hydrogen, fluorine, alkyl, fluoroalkyl, chloroalkyl, alkyl, phenyl, phenylalkyl, and alkylphenyl. In the groups in $R^3$ (i.e., also in $R^5$ and $R^6$), preferably the alkyl has 1 to 4 carbon atoms and preferably is linear (e.g., the alkyl in the fluoroalkyl, chloroalkyl, alkylphenyl, or phenylalkyl also is 1 to 4 carbon atoms and is linear). Examples of suitable alkyl groups include methyl, ethyl, propyl, isopropyl, and butyl. Examples of suitable alkylphenyls are methylphenol, ethylphenol, and butylphenol. Examples of suitable phenylalkyls include phenylmethyl, phenylethyl, and phenylpropyl. Preferably, $R^1$ and $R^2$ each is hydrogen. More preferably, $R^1$, $R^2$, each is hydrogen and $R^3$ is either hydrogen or the methyl moiety. Illustrative examples of the preferred first monomer (M1) in the present invention are (numbered as m1-1, etc.) listed in Table 1. As used herein, the term "ethylenically unsaturated end group" includes

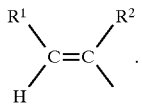

TABLE 1

Examples of M1

| m1-1) | $CH_2$=$CHCOO(CH_3)$ |
| m1-2) | $CH_2$=$CHCOO(C_4H_9)$ |
| m1-3) | $CH_2$=$C(CH_3)COO(CH_3)$ |
| m1-4) | $CH_2$=$C(CH_3)COO(C_4H_9)$ |
| m1-5) | $CH_2$=$C(CH_3)COO(C_4H_9)$ |
| m1-6) | $CH_2$=$CH(C_6H_5)$ |
| m1-7) | $CH_2$=$CHC_6H_4(CH_3)$ |
| m1-8) | $CH_2$=$CHC_6H_3(CH_3)_2$ |
| m1-9) | $CH_2$=$C(CH_3)(C_6H_5)$ |
| m1-10) | $CH_2$=$C(C_6H_5)_2$ |
| m1-11) | $CH_2$=$CHCONH(C_4H_9)$ |
| m1-12) | $CH_2$=$C(CH_3)CONHCH_3$ |
| m1-13) | $CH_2$=$CF_2$ |
| m1-14) | $CH_2$=$CHF$ |
| m1-15) | $CH_2$=$CHCl$ |
| m1-16) | 2-Vinylpyridine |
| m1-17) | 4-Vinylpyridine |
| m1-18) | Vinyl pyrrolidone |

TABLE 1-continued

Examples of M1

| m1-19) | Vinyl oxazoline |
| m1-20) | Vinylimidazole |

Monomers suitable for the present invention are available commercially and can be obtained from, e.g., Aldrich Chemical (St. Louis, Mo.) or PolyScience (Warrington, Pa.). It is to be understood that in the one or two dimensional representation of the ethylenically unsaturated molecules, either or both of the cis and trans molecules relating to a double bond in the molecule are meant to be included. Therefore, the copolymer of the present invention can be made using the cis or the trans molecules of an ethylenically unsaturated monomer (e.g., M1, M2, or M3).

The second type of monomers, M2, also has an ethylenically unsaturated end group such that this end group can join (i.e., covalently bond) with another ethylenically unsaturated end group of another monomer (which can, but not necessarily, be different from M2). A monomer of this type has another end group that renders the resulting copolymer adequately soluble in a polar solvent, for example, an alcohol (such as methanol, ethanol, isopropanol) or a fluorinated solvent (e.g., trifluromethanol, tetrafluoro-1-propanol, 2,2,3,3,3,-pentafluoro-1-propanol, trifluoroethanol, methyl heptafluoro butyrate, bis (trifuoromethyl benzene)) so that the copolymer can be dissolved in the solvent for coating on a photoconductor. This monomer also carries reactive functional groups such that cross-linking can occur via a cross-linking agent to form the photoconductor coating.

Generally, M2 has a molecule weight of about 70 to about 5,000 Daltons. It has the general formula $HR^7C$=$CR^8XY$, which in a two-dimensional representation is:

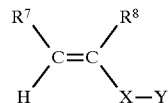

wherein $R^7$, $R^8$ each is selected from the group consisting of hydrogen, alkyl, phenyl, phenylalkyl, and alkylphenyl. In these groups (of $R^7$, $R^8$), preferably, alkyl has 1 to 4 carbon atoms and is preferably linear. Examples of suitable alkyl groups are methyl, ethyl, propyl, isopropyl, and butyl,. Examples of suitable alkylphenyls are methylphenol, ethylphenol, butylphenol. Examples of suitable phenylalkyls are phenylmethyl, phenylethyl, and phenylpropyl. Preferably, $R^7$ is hydrogen. More preferably, $R^7$ is hydrogen and $R^8$ is either hydrogen or methyl. X is a linking group. Preferably, X is selected from the linking groups consisting of —$COOX^1$—, —$CONHX^1$—; —$X^1$—, —$OX^1$—, wherein $X^1$ is selected from the group consisting of the divalent moiety of alkyl, aryl, and arylalkyl, wherein the alkyl has an alkanyl or methylene chain of 1 to 4 carbon atoms. More preferably $X^1$ is methylene. Y is a reactive functional group, preferably selected from the group consisting of —OH, —NCO, —COR (where R is —H, —OH, alkyl, aryl), —NHR (where R is —H, —OH, alkyl, aryl), anhydride group, and epoxy group. Illustrative examples of the preferred M2 monomer in the present invention are (numbered as m2-1, etc.) listed in Table 2:

TABLE 2

Examples of M2 m2-1) $CH_2=CHCOO(C_2H_4OH)$
m2-2) $CH_2=CHCONH(C_2H_4OH)$
m2-3) $CH_2=C(CH_3)COO(C_2H_4OH)$
m2-4) $CH_2=C(CH_3)CONH(C_2H_4OH)$
m2-5) $CH_2=CH(CH_2NCO)$
m2-6) $CH_2=CHCONH(C_2H_4OH)$
m2-7) Maleic anhydride

```
    CH══CH
    |     |
    C     C
   ⫽ \   / ⫽
  O    O    O
``` m2-8) $CH_2=CH(COOH)$
m2-9) $CH_2=CH(CH_2CHO)$
m2-10) $CH_2=CH(CH_2NH_2)$
m2-11) $CH_2=CH(CH_2PhNH_2)$ wherein Ph is a divalent phenyl moiety
m2-12) $CH_2=CH(CH_2NCS)$
m2-13) $CH_2=CH(CH_2CH_2CH_2NCO)$
m2-14) $CH_2=CH(COOCH_3)$
m2-15) Epoxy containing vinyl monomer

```
        CH3
        |
  H2C=C
        |
        COOCH2—CH — CH2
                \   /
                 O
``` m2-16) Itaconic anhydride

```
         CH2
        ⫽
       /
      C
     / \
    C   C
   ⫽ \ / ⫽
  O   O   O
``` m2-17) Itaconic acid

```
   HOOC—H2C
            \
             C=CH2
            /
       HOOC
``` m2-18) Itaconyl chloride

```
   ClOC—H2C
            \
             C=CH2
            /
       ClOC
```

Most of the above illustrative examples of M2 are available commercially from chemical companies, e.g., Aldrich, Sigma, Tokyo Kasei. M2 numbered m2-4 and m2-6 can be prepared by a reaction of ethanolamine and acryloyl chloride, as described in the Merk Index.

The third type of monomers, M3, is a perfluoropolyether that has ethylenically unsaturated end groups such that these end groups each can join (i.e., covalently bond) with another ethylenically unsaturated end group of another monomer (which can, but not necessarily, be different from M2) to form a polymer. This monomer, M3, has an amount of perfluoropolyether that renders a nonwetting characteristic to the resulting photoconductor coating to liquids (such as aqueous liquid and hydrocarbon liquids in toners). The M3 monomer has the general formula:

$$Z^1Q^1(CF_2CF_2O)_m(CF_2O)_nQ^2Z^2$$

wherein m is an integer from about 1 to about 10,000, n is an integer from 1 to 10,000. $Q^1$ and $Q^2$ each is a polyvalent linking group. In the above general formula for M3, the end groups $Z^1$ and $Z^2$ each has the formula:

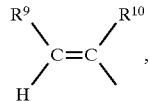

wherein $R^9$ and $R^{10}$ each is selected from the group consisting of hydrogen, alkyl, phenyl, phenylalkyl, and alkylphenyl in which alkyl preferably has 1 to 4 carbon atoms and is linear. The polymer has a molecular weight of from about 1,000 to about 500,000. For better reactivity, preferably, $R^9$ and $R^{10}$ each is hydrogen and therefore M3 is preferably $H_2C=CH—Q^1(CF_2CF_2O)_m(CF_2O)_nQ^2—CH=CH2$. The linking groups $Q^1$ and $Q^2$ each generally has a molecule weight of less than 500, preferably less than 200 and can be composed of atoms selected from carbon, hydrogen, oxygen and nitrogen. Examples of suitable linking groups, $Q^1$, $Q^2$, are listed in Table 3. Preferably, $Q^1$, $Q^2$ each is selected from the group consisting of —COO—, —COOQ$^3$—, —CONHQ$^3$—; —Q$^3$—, —OQ$^3$, wherein $Q^3$ is an alkanyl or methylene chain with 1 to 4 carbon atoms and is preferably linear. More preferably, $Q^3$ is methylene, —CH$_2$—. More preferred examples of $Q^1$ and $Q^2$ are —COO—, —CH$_2$COO—, —CH$_2$CONH—. In this monomer, m is preferably from 1 to 10,000, and more preferably from 1 to 100. The value of n is preferably from 1 to 10,000, and more preferably from 1 to 100.

TABLE 3

Examples of linking groups $Q^1$ and $Q^2$ $$-\overset{O}{\underset{\|}{C}}OCH_2-,$$

$$-\overset{O}{\underset{\|}{C}}O-(CH_2)_2-\overset{O}{\underset{\|}{N}}HC-,$$

$$-\overset{O}{\underset{\|}{C}}NH-(CH_2)_2-\overset{O}{\underset{\|}{N}}HC-CH2,$$

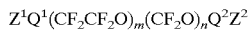

$-CH_2OCH_2-,$ $$-CH_2O\overset{O}{\underset{\|}{C}}NH-\underset{\phantom{xx}}{\underset{\phantom{xx}}{\bigcirc}}-NH\overset{O}{\underset{\|}{C}}OCH_2-,$$

$$-CH_2O-(CH_2)_2-\overset{O}{\underset{\|}{N}}HC-,$$

$$-CH_2NH\overset{O}{\underset{\|}{C}}-,$$

$$-CH_2NH\overset{O}{\underset{\|}{C}}OCH_2-,$$

$$-(CH_2)_2-\overset{O}{\underset{\|}{C}}OCH_2-,$$

TABLE 3-continued $-(CH_2)_8-\overset{O}{\overset{\|}{C}}OCH_2-,$ $-CH_2NH\overset{O}{\overset{\|}{C}}OCH_2CH_2NH\overset{O}{\overset{\|}{C}}-,$ $-CH_2N\overset{O}{\overset{\|}{C}}NH(CH_2)_6NH\overset{O}{\overset{\|}{C}}OCH_2-,$
  $\quad\ \ |$
  $\ \ \ CH_3$ $-CH_2NH\overset{O}{\overset{\|}{C}}-(CH_2)_2-NH\overset{O}{\overset{\|}{C}}-,$

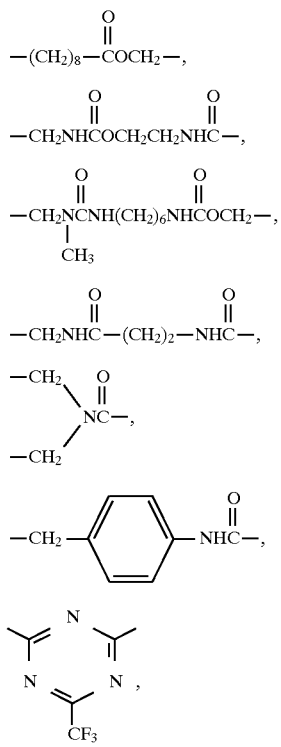

TABLE 3-continued and $-\overset{O}{\overset{\|}{C}}NHC(CH_3)_2\overset{O}{\overset{\|}{C}}NHCH_2-.$ Examples of the preferred M3 in the present invention are:

$CH_2=CHCOO(CF_2CF_2O)_m(CF_2O)_nCOOCH=CH_2,$
$CH_2=CHCH_2CONH(CF_2CF_2O)_m(CF_2O)_nCONHCH_2CHCH=CH_2,$

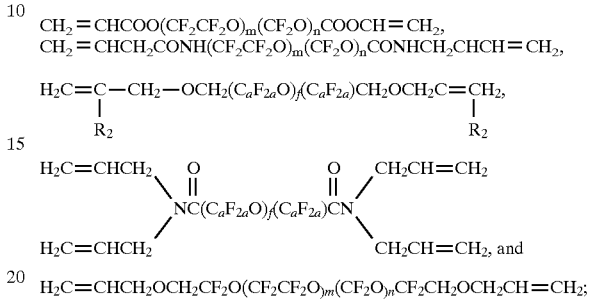

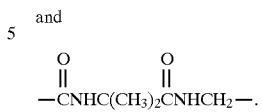

$H_2C=CHCH_2OCH_2CF_2O(CF_2CF_2O)_m(CF_2O)_nCF_2CH_2OCH_2CH=CH_2;$ wherein f is a number of at least two, prferably an average of about 3 to 500, a in each unit is independently an integer of 1 to 4, and m and n are as defined above. Illustrative examples of the more prefferred M3 monomer include (listed in Table 4):

Examples of M3

TABLE 4

Examples of M3

$H_2C=CHCO(CH_2)_2NH\overset{O}{\overset{\|}{C}}CF_2O(CF_2CF_2O)_8(CF_2O)_{14}CF_2\overset{O}{\overset{\|}{C}}NH(CH_2)_2O\overset{O}{\overset{\|}{C}}CH=CH_2$ $H_2C=CH\overset{O}{\overset{\|}{C}}NHC(CH_3)_2\overset{O}{\overset{\|}{C}}NHCH_2CF_2O(CF_2CF_2O)_8(CF_2O)_{14}CF_2CH_2NH\overset{O}{\overset{\|}{C}}C(CH_3)_2NH\overset{O}{\overset{\|}{C}}CH=CH_2$ $H_2C=CHCH_2O\overset{O}{\overset{\|}{C}}CF_2O(CF_2CF_2O)_8(CF_2O)_{14}CF_2\overset{O}{\overset{\|}{C}}OCH_2CH=CH_2$ $H_2C=CH\overset{O}{\overset{\|}{C}}OCH_2CH_2NH\overset{O}{\overset{\|}{C}}CFO(CF_2CFO)_3CF_2CF_2CF_2(OCFCF_2)_2OCF\overset{O}{\overset{\|}{C}}NHCH_2CH_2O\overset{O}{\overset{\|}{C}}CH=CH_2$
$\qquad\qquad\qquad\qquad\qquad\ \ |\qquad\ \ |\qquad\qquad\qquad\ \ |\qquad\ \ |$
$\qquad\qquad\qquad\qquad\qquad\ CF_3\quad CF_3\qquad\qquad\ CF_3\quad CF_3$ $H_2C=CH\overset{O}{\overset{\|}{C}}OCH_2CF_2O(CF_2CF_2O)_8(CF_2O)_{14}CF_2CH_2O\overset{O}{\overset{\|}{C}}CH=CH_2$ $H_2C=C\overset{}{\overset{}{C}}\overset{O}{\overset{\|}{C}}OCH_2CF_2O(CF_2CF_2O)_{16}(CF_2O)_{28}CF_2CH_2O\overset{O}{\overset{\|}{C}}C=CH_2$
$\quad\quad\ |\qquad\qquad\qquad\qquad\qquad\qquad\qquad\qquad\qquad\ \ |$
$\quad\ \ CH_3\qquad\qquad\qquad\qquad\qquad\qquad\qquad\qquad\ CH_3$ $H_2C=CHCH_2OCH_2CF_2O(CF_2CF_2O)_{16}(CF_2O)_{28}CF_2CH_2OCH_2CH=CH_2$ $H_2C=CHCH_2NH\overset{O}{\overset{\|}{C}}(CF_2CF_2O)_8(CF_2O)_{14}CF_2\overset{O}{\overset{\|}{C}}NHCH_2CH=CH_2$

TABLE 4-continued

Examples of M3

$$H_2C=CHCH_2\diagdown\phantom{xx}\overset{O}{\underset{\|}{NC}}(CF_2CF_2O)_8(CF_2)_{14}CF_2\overset{O}{\underset{\|}{CN}}\diagup CH_2CH=CH_2$$
$$CH_2=CHCH_2\diagup\phantom{xxxxxxxxxxxxxxxxxxxxxxxxxx}\diagdown CH_2CH=CH_2$$

$$H_2C=CHCH_2OCH_2CF_2O(CF_2CF_2O)_{14}(CF_2O)_{70}CF_2CH_2OCH_2CH=CH_2$$

$$H_2C=CHCH_2OCH_2CF_2O(CF_2CF_2O)_{80}(CF_2O)_{140}CF_2CH_2OCH_2CH=CH_2$$

$$H_2C=CHCH_2O(CH_2)_2NH\overset{O}{\underset{\|}{C}}(CF_2CF_2O)_{30}(CF_2O)_6CF_2\overset{O}{\underset{\|}{C}}NH(CH_2)_2OCH_2CH=CH_2$$

$$H_2C=CHC\overset{O}{\underset{\|}{O}}(CH_2)_2\underset{CH_3}{\overset{O}{\underset{\|}{N}}C}(CF_2CF_2O)_{17}(CF_2O)_{30}CF_2\underset{CH_3}{\overset{O}{\underset{\|}{C}}N}(CH_2)_2O\overset{O}{\underset{\|}{C}}CH=CH_2$$

$$H_3CCH=CHCH_2O\overset{O}{\underset{\|}{C}}CF_2O(CF_2CF_2O)_8(CF_2O)_{14}CF_2\overset{O}{\underset{\|}{C}}OCH_2CH=CHCH_3$$

$$H_{25}C_{12}CH=CH\overset{O}{\underset{\|}{C}}OCH_2CF_2O(CF_2CF_2O)_8(CF_2O)_{14}CF_2CH_2O\overset{O}{\underset{\|}{C}}CH=CHC_{12}H_{25}$$

[Complex cyclohexane-containing structure with NHCOCH₂CH=CH₂ groups and $CH_2NHCO(CH_2)_2NHCCF_2O(CF_2CF_2O)_8(CF_2O)_{14}CF_2$ linker, with NHCOCH₂CH=CH₂ and $CH_2NHCO(CH_2)_2NHC=O$ terminal groups]

$$Ph-CH=CH\overset{O}{\underset{\|}{C}}OCH_2CF_2O(CF_2CF_2O)_8(CF_2O)_{14}CF_2CH_2O\overset{O}{\underset{\|}{C}}CH=CH-Ph$$

$$H_2C=CHCH_2-Ph-NH\overset{O}{\underset{\|}{C}}CF_2O(CF_2CF_2O)_8(CF_2O)_{14}CF_2\overset{O}{\underset{\|}{C}}NH-Ph-CH_2CH=CH_2$$

$$H_2C=\underset{Ph}{C}\overset{O}{\underset{\|}{C}}OCH_2CF_2O(CF_2CF_2O)_8(CF_2O)_{14}CF_2CH_2O\overset{O}{\underset{\|}{C}}\underset{Ph}{C}=CH_2$$

Methods of making perfluoropolymers such as M3 are Known in the art (for example, U.S. Pat. Nos. 3,810,874; 4,321,404; and 4,565,714 whose methods or making perfluoropolymers are incorporated by reference herein). Many of the M3 monomers are available commercially (e.g., from 3M Co., St. Paul, Minn.).

As previously described, the aforementioned three types of monomers (i.e., M1, M2, M3) are used to form a copolymer. It is understood that in each type, various (or dissimilar) monomers can be used in the same polymerization reaction. To this end, the three types of monomers are included in a composition: M1 at about 0.1 to about 20 mole percent, preferably about 5 to about 20 mole percent, more preferably about 10 to about 20 mole percent; M2 at about 0.1 to about 20 mole percent, preferably about 5 to about 20 mole percent, more preferably about 10 to about 20 mole percent; and M3 at about 0.1 to about 80 mole percent, preferably about 5 to about 80 mole percent, more preferably about 20 to about 60 mole percent, each on the reactant monomers. Within the ranges for each type of monomer, there can be molecules of different structures.

To make the copolymer, the monomers M1, M2, and M3 in the above molar ratio (e.g., for convenience, weight ratios of about 5–45% of M1, about 5–45% of M2, about 10–90% of M3) are mixed in an appropriate solvent (e.g., alcohol or fluorinated solvent) to obtain a concentration range of preferably about 10–50% solids by weight. Preferably, there is more M3 than either M1 or M2. An initiator (e.g., 2,2-azo-bis-isobutyronitrile (AIBN), about 0.01–10% by weight) is added under nitrogen purging to the above-described mixture of monomers. The mixture with the initiator is heated to about 40° C. to 110° C. for about 5 to 300 minutes to polymerize the monomers to obtain a copolymer. For ease of handling, the reacting temperature is preferably about 55° C. to 80° C. The choice of the initiator is not limited to AIBN. Any compound that can generate free radicals in the temperature range of about 35° C. to 150° C. can be used, for example, AIBN, di-tert-butyl peroxide, isopropyl peroctoate, 2,2′-azo-bis-(2,4-dimethylvaleronitrile), phenyl-azo-isobutyronitrile, and the like. Free radical initiators and their use are known in the art (see, e.g., U.S. Pat. No. 5,075,106 (Goldenberg), which is incorporated by reference herein). It is to be understood that when a photoinitiator is used, ultraviolet light can be used to polymerize the monomers.

If M1, M2, and M3 are reacted this way, the resulting perfluoropolyether-containing copolymer (hereinafter called "perfluoro-copolymer") is a terpolymer and has the overall formula $A_xB_yC_z$ wherein A is the component of M1, B is the component of M2, and C is the component of M3 after the polymerization reaction. In this overall formula, x, y, and z are the average number of molar percentage of the residues of A, B, and C, respectively. The formula $A_xB_yC_z$ does not represent that the perfluoro-copolymer is a block copolymer, even though blocks of residues of monomers M1, M2, M3 by the polymerization can, but not necessarily, be contained in the perfluoro-copolymer. The perfluoro-copolymer can be a random copolymer. As used herein, the term "component" or "residue" of a monomer refers to the residual part of the monomer in a polymer formed in the polymerization reaction (in which the ethylenically unsaturated bonds are broken to form single covalent bonds, thus joining two monomer molecules). The resulting terpolymer has a molecular weight of about 1,000 to 500,000. The molecular weight can be determined by a variety of methods (e.g., see Kirk-Othmer's *Encyclopedia of Chemical Technology*, 3rd. ed., 18:210–212, John Wiley & Sons, 1982). Preferably, the molecular weight is determined by light scattering.

For illustrating the polymerization, when $HR^1C=CR^2R^3$, $HR^7C=CR^8XY$, and $H_2C=CH-Q^1(CF_2CF_2O)_m(CF_2O)_nQ^2-CH=CH_2$ are reacted, (using L to represent $-Q^1(CF_2CF_2O)_m(CF_2O)_nQ^2-$), the resulting polymer can have the following bonds:

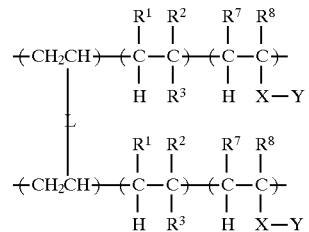

In this way, a three-dimensional molecular structure is formed. It is understood that each monomer can join with a monomer of the same type or of a different type among M1, M2, and M3. A person skilled in the art will understand how M1, M2, and M3 are joined and that other bonds not illustrated in the above structure can be formed as well as understand what bonds can be formed when other monomers of M3 are used.

Photoconductor Coating

The top coating of the photoconductor can be formed by a cross-linking reaction of the perfluoro-copolymers AxByCz due to the reactive functional groups mentioned above. This copolymer that contains a perfluoro component is soluble in suitable solvents (e.g., alcohols, fluorinated alcohols, fluorinated esters) for use as a coating solution for the top surface of the photoconductor. The coating can be done with a number of a conventional coating processes, including the use of bar (wound wire bar), doctor blade, kip coating, or ring coating, to yield a suitable thickness. In order to achieve a firm, solid top coating the copolymers containing perfluoro component is blended with a suitable crosslinker. Without the crosslinker, the coating will stay wet even though the solvent has evaporated because the copolymer which contains perfluoro component exhibits low Tg (glass transition temperature) until it becomes crosslinked and forms a firm solid. The suitable crosslinker for the above mentioned copolymer AxByCz is selected from the chemicals which are compatible with the AxByCz copolymer in a suitable solvent and which exhibits suitable reactivity with the reactive functional group already existing in the By (i.e., M2) residues. Examples of cross-linking agents applicable for this purpose include isocyanates, diisocyanates, triisocyanates, phenolic resines, epoxy resines, melamine resines-dialdehydes, trialdehydes, diols, triols, tetraols, trialkoxysilanes, and the like. Isocyanates that are useful have a carbon backbone (aliphatic or aromatic) generally of a length of 1 to 18 carbon atoms, preferably of 1 to 4 carbon atoms. Some example of reactive partners are listed in Table 5.

TABLE 5

| Reactive partners (By residues and crosslinker) |
|---|
| a) —NCO reacts with —OH |
| b) —NH$_2$ reacts with —OH |
| c) —COOH with —OH |
| d) —COOH with —NH$_2$ |
| e) —OH with self |
| f) —CHO with —OH |
| g) Epoxy |

In some cases, a suitable catalyst is needed to accelerate the crosslinking reaction based on the reactivity between the partners. For example, zinc hexuate, tin hexuate, tin butyl laureate, or the like is required for the reaction of —CH$_2$OH with ester —COOH, and the like.

Table 6 lists examples of the crosslinkers found useful for the crosslinking of the AxByCz copolymers of the invention.

TABLE 6

Useful crosslinkers x-1) Glutaraldehyde (from Aldrich)
x-2) Trialdehyde (from Aldrich)
x-3) Toluenediisocyanate (Aldrich)

x-3) 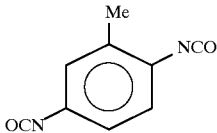 (2,6-Toluene diisocyanate, Aldrich and Bayer)

x-4) 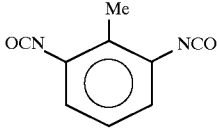 (2,4-Toluene diisocyanate, Aldrich and Bayer)

x-5) 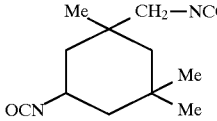 (Isophorone diisocyanate, Aldrich and Bayer product))

x-6) OCN—⟨phenyl⟩—CH₂—⟨phenyl⟩—NCO (Mondur M, Bayer product)

x-7) OCN—⟨cyclohexyl⟩—CH₂—⟨cyclohexyl⟩—NCO (Desmondur W, Bayer product)

x-8) OCN—(CH₂)₆—NCO (Desmodur H, Bayer product)

x-9) 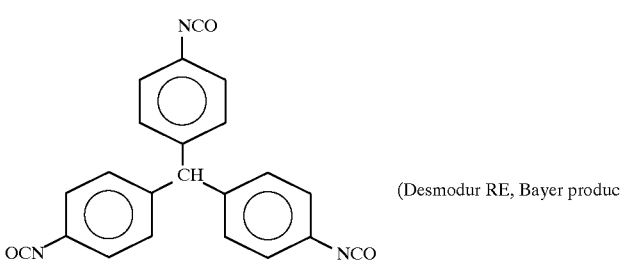 (Desmodur RE, Bayer product)

x-10) 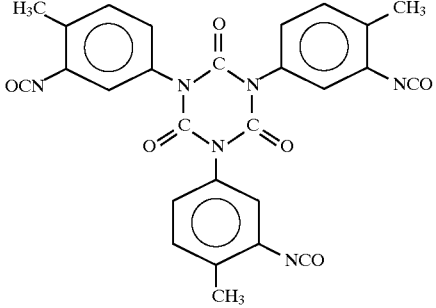 (Desmodur IL, Bayer product)

TABLE 6-continued
Useful crosslinkers
x-11) 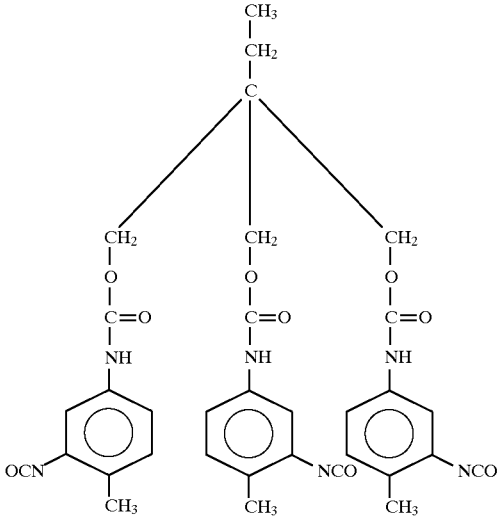
(Mondur CB, Bayer product)
x-12) 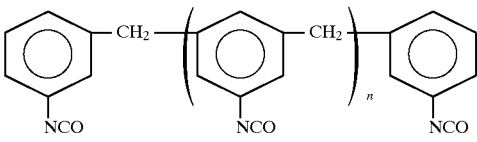
n = 0 to 4
(Mondur MR, MRS, MRS 4 and MRS 5, Bayer product)
x-13) 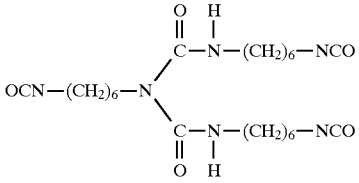
(Desmodur N-75, N-100 and N-3200, Bayer product)
x-14) 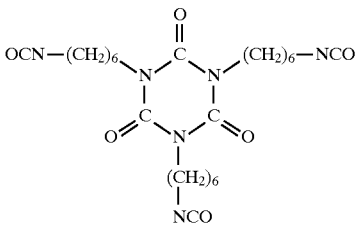
(Desmodur N-3300 and N-3900, Bayer product)
x-15) 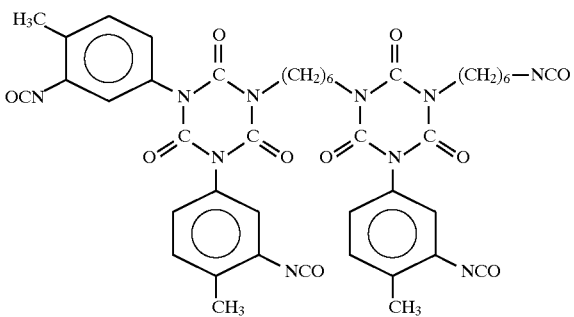
(Desmodur HL, Bayer product)

TABLE 6-continued

Useful crosslinkers x-16)  OCN—⟨C6H4⟩—NHCOCF$_2$O(CF$_2$CF$_2$O)$_m$(CF$_2$O)$_n$CF$_2$CONH—⟨C6H4⟩—NCO
(Av. Mol. Wt. 1500)
(Z-DISOC, Ausimont product)

x-17)  HOOC(CF$_2$CF$_2$O)$_m$(CF$_2$O)$_n$CF$_2$COOH
(Av. Mol. Wt. 2000)      (Z-DIAC, Ausimont product)

x-18)  MeOOC(CF$_2$CF$_2$O)$_m$(CF$_2$O)$_n$CF$_2$COOMe
(Av. Mol. Wt. 2000)      (Z-DEAL, Ausimont product)

x-19)  HO(CH$_2$CH$_2$O)$_p$CH$_2$CF$_2$O(CF$_2$CF$_2$O)$_m$(CF$_2$O)$_n$CF$_2$CH$_2$O(CH$_2$CH$_2$)$_p$OH
(Av. Mol. Wt. 2200)      (Z-DOL TX, Ausimont product)

x-20)  HOCH$_2$CHCH$_2$OCH$_2$CF$_2$O(CF$_2$CF$_2$O)$_m$(CF$_2$O)$_n$CF$_2$CH$_2$OCH$_2$CHCH$_2$OH
       |                                                                |
       OH       (Av. Mol. Wt. 500)                                       OH
(Z-TETRAOL, Ausimont product)

To form the top coating of the photoconductor, a photoconductor substrate is coated with a composition having the perfluro-copolymer and a suitable cross-linking agent, catalyst (if needed) and then cured. Preferably, the perfluro-copolymer is dissolved in an effective solvent (preferably a fluorinated hydrocarbon solvent) at a concentration of about 1% to about 50%, more preferably about 5% to about 30% by weight. An effective amount of a cross-linking agent is preferably dissolved in the solvent as well. Generally, the cross-linking agent is about 1% to about 30% by weight on the perfluro-copolymer.

Such a composition is then coated on a photoconductor and cured. Photoconductors generally has a electrically conductive substrate and a photosensitive layer, which can have a charge generating layer and a charge transporting layer. The substrate can be a metal or alloy, such as aluminum, stainless steel, or the like. The photosensitive layer can have a thickness of about 100 to 5000 Angstroms. Photoconductor constructions are known in the art (see, e.g., U.S. Pat. No. 4,996,125 (Sakaguchi et al.), which is incorporated by reference herein). The curing process to form the perfluoro-copolymer top coating on the photoconductor can be done by a number of methods including thermal cure (by heat), irradiation cure (by UV, electron beam, X-ray, and the like), depending on the initiator or catalyst used to facilitate the cross-linking reaction. Preferably, curing is done at a temperature of about 60° C. to about 200° C., more preferably about 80° C. to about 150° C. The thickness of the coating after being cured is about 0.05 μm to about 5 μm.

During the curing process, a reaction occurred between the reactive functional groups in the component By of the copolymer AxByCz with the reactive groups of the suitable crosslinkers (this combination is described in Table 5). This reaction forms a crosslinking network between polymer chains. This crosslinking network is no longer swellable or soluble in solvent and becomes a very effective protection for the photoconductor against hydrocarbon liquid corrosion. Such a macromolecule is suitable as a coating on a photoconductor for use in printing on paper using a liquid-containing toner.

Due to the perfluoropolyether component, this top coating exhibits excellent liquid repellency and becomes very effective in eliminating the liquid out of the toner image during the liquid toner developing process. For example, a liquid toner component having about 2% solids exhibits a solids content greater than 90% after being electrostatically deposited to the surface of this coating. Furthermore, this top coating component provides a surface energy which can be lower than about 30 dynes/cm, as low as about 20 dynes/cm. This allows a transfer efficiency of essentially 100% of film-forming toner from the coating surface to paper. Another advantage of the top coating of the photoconductor in the present invention is related to the residual potential of the device after photo-writing repeat cycles and a high contrast image is easily obtained. This contribution is due to the component Ax from M1 monomer, which tend to modify the dielectric constant of the top coating materials. Due to the electrical charges distributed on the photoconductor surface according to the light pattern, toner particles (i.e., colorant, or pigment particles) are retained on the surface of the photoconductor before being transferred to paper. However, the nonwetting characteristics of the perfluoropolyether in the macromolecule helps to shed the liquid in the liquid toner. Because of the low surface energy on the photoconductor coating, the carrier liquid (typically a hydrocarbon liquid) does not substantially adhere to the photoconductor coating. Generally, less than about 30%, more preferably less than about 10% of the carrier liquid applied to the photoconductor is retained on the surface of photoconductor coating. Consequently, when the toner particles are transferred from the photoconductor surface to a piece of paper, the amount of liquid being transferred from the photoconductor to the paper during the printing process will be reduced and at an acceptable level, and in many instances, the paper is substantially free of the toner liquid and no toner liquid will be perceived to be on the paper by a human operator.

EVALUATION PROCEDURE

Xerographic evaluation

A photoconductor drum is charged with corona charging at +6,000V and then exposed to a 780 nm laser diode scanning print head synchronized with 80% power duties of the laser. The drum was rotated with the speed of 3 inches per second. The surface potential was detected by electrostatic charge probe meter (TREK model 362) located right after corona charger and before laser beam print head. This probe gave rise to the measured value of the initial surface potential Vo (V). A second probe was located at the developer position to measure surface potential Vd (V) of the photoconductor at the development. The Vd value measures the laser response (or xerographic sensitivity) of the photoconductor. Due to the discharged area development, the smaller Vd (V) resulted in darker image density, i.e., higher xerographic speed. In the case of dark decay measurement, the laser would be off and the dark decay is measured by the rate of discharge of initial potential Vo (V) in dark as DD (V/s). After development station the photoconductor drum is exposed to an eraser with 720 nm LED bar. The third probe located after the eraser gave the value of the residual voltage Vr (V). A good photoconductor should have a small or zero Vr value. A photoconductor made with a top coating with the perfluoro-copolymer of the present invention when evaluated with a Vo of about 500V to about 700V has a Vr of about 15 V or less; a DD of about 2 V/s ore less; and a surface energy of about 16 dyne.cm or less. Typically, such a photoconductor according to the present invention has a transfer efficiency of substantially about 100%. The transfer efficiency does not significantly deteriorate even after repeated use (e.g., less than 1% decrease after 10,000 cycles, with procedure described in Example 6 below).

Measurement of the release properties of the top coating

To measure the surface energy, we measured the maximum pulling force required to remove completely an object adhered to the surface of a drum 10. This measurement was carried out by a mechanical rotation of the photoconductor coating 14 around a lateral axis 16 due to the peeling force F1 perpendicular to the rotational direction. The peeling force F1 was generated by the load M (FIG. 1) via a wheel having substantially zero friction. An adhesive tape (e.g., 3M SCOTCH tape) 20 was used as the object attached on the drum surface by adhesion.

Thus, a bigger load M that is required to peel off the adhesive tape suggested poorer release properties. The surface energy is calculated by F=k.M.d (k=gravity factor, d=drum rotation distance from the beginning of the peel force until the tape is completely removed, e.g., about 3 inches for each run).

Transfer evaluation

The photoconductor (B) described in Example 3 below was incorporated in a prototype laser printer developed at Hewlett-Packard Company for laser imaging evaluation with liquid toner. In this printing system, the photoconductor was charged with corona charger of which the grid voltage was set at +600V. The latent image was created by a laser scanning system synchronized at 780 nm through a polygon mirror. The latent image was developed into the visible image with a black film-forming liquid toner (average particle size 0.5 $\mu$m) (as described in U.S. Pat. Nos. 4,946,753 and 4,925,766, which are incorporated by reference herein). The film-forming liquid toner, as described in these patent disclosures, exhibited a Tg below room temperature, which enhanced the film-forming properties due to the increased adhesion. This was a positive charging toner and the solids content of toner in the developer was 2 wt %. In the development process, the development roller was set at a development bias of +250V and development time was 2 seconds. After the image was developed, the liquid carrier was removed from the toner image by a biased reverse squeeze roller (a method known in the art) and then by a hot air flow. This treatment yields a toner image having solids content of 96 wt % on the surface of the photoconductor (B), ready for the transfer onto plain paper. In the transfer step, the "semi-dried" toner image mentioned above was pushed against an image receiving object (plain paper) placed on the top of a silicone rubber roller having a durometer of 4 shore. The pressure in this case was about 80 psi ($5.5 \times 10^5$ N/m$^2$). This transfer efficiency was measured by a portion of toner on image receiving object (or medium) versus the total amount of toner initially developed on the drum. The temperature of the transfer rubber roller was set at 75° C.

EXAMPLES

Example 1

Preparation of the terpolymer containing perfluoropolyether with methyl methacrylate Methyl methacrylate (0.4 g, 4 mmol), purified hydroxyethyl methacrylate (HEMA) (0.4 g, 3.07 mmol) and diacrylate of perfluoropolyether (3M Company, 1.2 g, 0.6 mmol) were mixed in trifluoroethanol (3 g). The initiator azobisisobutyronitrile (AIBN) (30 mg) was added to the above solution. This reaction mixture was degassed with dry nitrogen for 30 minutes and heated at 60° C. for 55 minutes. The solution became viscous to give rise to 40% solids solution of the terpolymer (i.e., perfluoro-copolymer) in trifluoroethanol.

Example 2

Preparation of the photoconductor (A)

X-form metal free phthalocyanine (15 g), 85 g of poly vinyl butyrate (B98, Monsanto Chemical), 900 g of dichloromethane (DCM) were milled together in a Sweeco mill using still stainless beads (special burning grade, 5 mm diameter) for 72 hours. The blue suspension was separated from beads using a glass filter. The suspension was coated on an aluminum Al drum (160 mm diameter) by a ring coating with adjusted coating speed to achieve a thickness of 10 $\mu$m after being baked at 80° C. for 2 hours and further baking at 200° C. for 2 hours. This produced the bare photoconductor (A).

Example 3

Preparation of the top coating and photoconductor (B)

Perfluoro-copolymer solution (10 g, 40% solids) achieved from Example 1, and 1.88 g of DESMODUR NP75 (poly diisocyanate product from Mobay Chemical) (70% solids) were mixed with a suitable amount of trifluroethanol to achieve a clear solution having 10% solids (Solution R1). This solution was coated on the top of the bare photoconductor (A) described in Example 2 using a ring coating. The coating layer was baked at 135° C. for 2 hours and the thickness was detected to be 1.5 $\mu$m. This example resulted in a photoconductor (B) with a top coating.

Comparison Example 1(a)

Comparison of pure perfluoropolyether and terpolymer containing perfluoropolyether One gram of perfluoropolyether diacrylate (3M Co.) was dissolved in 9 g of trifluoroethanol to achieve a clear solution of 10% (Solution CR1) solids. Example 3 was repeated except that the top coating was made from solution CR1 instead of solution R1 described above. In this case, in order to receive a firm top coating, a further baking was carried out after 135° C. for 5 seconds. This coating gave rise to photoconductor (CEX-1A).

Comparison Example 1(b)

In this case, Comparison Example 1(a) was repeated, except that the perfluoropolyether diacrylate was replaced by the perfluoropolyether diol (FC2202, 3M Co.). This coating gave rise to the photoconductor (CEX-1B)

Comparison Example 1(c)

In this case, Comparison Example 1(a) was repeated, except that the perfluoropolyether diacrylate was replaced by a block copolyester having perfluoropolyether. The synthesis of this block copolymer was described in Examples 1 and 2 of U.S. Pat. No. 4,772,526. This gave rise to photoconductor (CEX-1C). The xerographic properties, the release properties, the transfer efficiency (onto the plain paper) of these photoconductors are illustrated in Table 7.

TABLE 7

Effect of the top coating on the xerographic properties

| Sample (photo conductor) | Vo(V) | DD(V/s) | Vd(V) | Vr(V) | Surface energy F(dyne/cm) | Transfer efficiency |
|---|---|---|---|---|---|---|
| A (Example 2) | +550V | 2.0 | 50.0 | 15.0 | 70.0 | <5.0% |
| B (Example 3) | +580V | 1.3 | 55.0 | 15.0 | 16.0 | 100% |
| CEX-1A | +700V | 0.60 | 650.0 | 650.0 | 16.0 | 100% |
| CEX-1B (ComEx-1b) | +730V | 0.75 | 610.0 | 600.0 | 16.0 | 100% |
| CEX-1C (ComEx-1c) | +620V | 1.2 | 400.0 | 350.0 | 42.0 | 50% |

It was observed that the black toner would not be able to develop on the photoconductors CEX-1A, -1B, and -1C due to the poor contrast. In order to do the transfer evaluation, the photoconductors were uncharged by turning off the corona charger. The release properties of the photoconductor A and CEX-1C was poor due to high surface energy, with low transfer efficiency. The top coating of the photoconductors CEX-1A,-1B, and -1C caused some electrical properties problems. Even though some of them (-1A, -1B) exhibited good release properties and good transfer efficiency, they were not suitable for the xerographic process.

Example 1(B)
Preparation of terpolymer with fluorinated styrene

3-Trifluoromethyl styrene (0.8 g, 4.65 mmol), purified hydroxyethyl methacrylate (0.4 g, 3.07 mmol) and diacrylate of perfluoropolyether (FCC2212, 3M product, MW=2,000) (0.8 g, 0.4 mmol) were mixed in trifluoro ethanol (3.0 g). The initiator azobisisobutyronitrile (AIBN) (30 mg) was added to the above solution. This reaction mixture was degassed with dry nitrogen for 30 minutes and heated at 70° C. for 20 minutes. The solution became viscous and more trifluoroethanol (15 g) was added to obtain a 10% solids solution of the terpolymer in trifluoroethanol. This solution was used for coating photoconductor to form the top coating (as in Example 3).

Example 1(C)
Preparation of terpolymer with fluorinated styrene(2)

The procedure for Example 1(B) was repeated except that 4-fluorostyrene was used instead of 3-trifluoromethyl styrene.

Example 1(D)
Preparation of terpolymer with tetrafluoropropyl methacrylate

Tetrafluoropropyl methacrylate (0.92 g, 5.476 mmol), purified hydroxyethyl methacrylate (0.46 g, 3.53 mmol) and diacrylate of perfluoropolyether (FC2212, 3M, MW=2,000) (1.38 g, 0.69 mmol) were mixed in trifluoroethanol (3 g). The initiator azobisisobutyronitrile (AIBN) (30 mg) was added to the above solution. This reaction mixture was degassed with dry nitrogen for 30 minutes and heated at 58° C. for 82 minutes. The solution became viscous and more trifluoroethanol (21.84 g) was added to obtain a 10% solids solution of the terpolymer in trifluoroethanol. This solution was used to form a top coating (see Example 3 for procedure) for photoconductor.

Example 1(E)
Preparation of terpolymer with trifluoroethyl metharylate

The procedure of Example 1(D) was repeated except that trifluoethyl methacrylate was used instead of tetrafluoropropyl methacylate.

Example 1(F)
Preparation of copolymer with hydroxyethyl methacrylate

Purified hydroxyethyl methacrylate (1.08 g, 14.9 mmol) and diacrylate perfluoropolyether (0.495 g, 0.248 mmol, FC2213, 3M Co.) were mixed in 2,2,3,3-tetrafluoro-1-propanol (3.75 g). The initiator azobisisobutyronitrile (AIBN) (30 mg) was added to the above solution. This reaction mixture was degassed with dry nitrogen for 30 minutes and heated at 55° C. for 15 minutes. The solution became viscous and more 2,2,3,3-tetrafluoro-1-propanol was added to obtain a 10% solids solution. This solution was used to form a top coating (as in Example 3) for photoconductor. The testing result is shown in Table 8.

TABLE 8

Effect of component A (i.e., M1) in the copolymer AxByCz as top coating for the photoconductor

| Sample | Vo(V) | DD(V/s) | Vd(V) | Vr(V) | Surface energy F(dyne/cm) | Transfer efficiency |
|---|---|---|---|---|---|---|
| Fluorinated styrene (Example 1B) | 560 | 2.0 | 55 | 10 | 15.0 | 100% |
| Trifluoromethyl styrene (Example 1C) | 540 | 2.2 | 50 | 8 | 16.0 | 100% |

TABLE 8-continued

Effect of component A (i.e., M1) in the copolymer AxByCz as top coating for the photoconductor

| Sample | Vo(V) | DD(V/s) | Vd(V) | Vr(V) | Surface energy F(dyne/cm) | Transfer efficiency |
|---|---|---|---|---|---|---|
| Tetrafluoropropyl Methacrylate (Example 1D) | 550 | 2.0 | 50 | 10 | 15.0 | 100% |
| Trifluoroethyl Methacrylate (Example 1E) | 570 | 1.8 | 40 | 5 | 17.0 | 100% |
| No A (Example 1F) | 200 | 10.0 | 10 | 5 | 18.0 | 100% |

Thus, a top coating with AxByCz has good transfer efficiency. Evaluation results, including that shown in Table 8, show that without the component A in the copolymer AxByCz, the copolymer exhibits dark decay that is too high and is not suitable for xerographic process.

Example 4

Preparation of multi-layer photoconductor (C)

Hole transport molecule (T-1) (40 g)

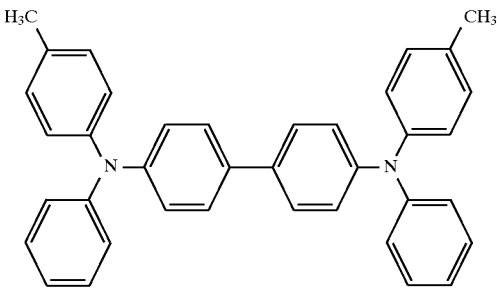

and 60 g of polycarbonate MAKROLON (Mobay Chemical) were dissolved in 900 g mixture of dichloromethane (DCM) and 1,1,2-trichloroethane (TCE) (DCM/TCE=6/4). The solution was coated on an aluminum substrate of a drum having diameter of 160 mm using a dip coater. The viscosity and coating speed was adjusted in a conventional way so that the coating thickness was about 15 μm after being dried properly. The coating was dried at room temperature for 20 minutes and in an oven set at 95° C. for another 2 hours. This is the charge transport layer (CTL). To prepare the charge generation layer (CGL), 10 g of titanyl phthalocyanine pigment and 5 g of polyester VYLON 200 (Toyobo) were milled together with 135 g DCM using a Sweeco mill and special burning grade steel stainless beads (5 mm diameter) as milling media for 72 hours. The CGL solution was coated on the top of the CTL with proper speed to achieve a coating thickness of 1 μm after being dried at 60° C. for 30 minutes. This procedure gave a multi-layer photoconductor (C)

Example 5

The procedure of Example 3 (with terpolymer of Example 1) was repeated except that the photoconductor which received the top coating was a multi-layer photoconductor (C) described above. In this case, the top coating baking condition was at 95° C. for 1 hour. The evaluating result was summarized in Table 9.

TABLE 9

Perfluoro copolymer coating for multi-layer photoconductor

| Sample | Vo(V) | DD(V/s) | Vd(V) | Vr(V) | Surface energy F(dyne/cm) | Transfer efficiency |
|---|---|---|---|---|---|---|
| Example 4 | 650 | 1.0 | 5.0 | 0.0 | 67.0 | <5% |
| Example 5 | 667 | 0.8 | 6.2 | 2.5 | 16.0 | 100% |

Example 6

Repeat cyclic stability evaluation

The full construction photoconductors (with top coating) were exposed to the transfer evaluation 10,000 cycles at room temperature and 70% relative humidity. The xerographic data of the first cycle (represented by (1) in Table 10)was compared to that of the last cycle (represented by (10K) in Table 10). Table 10 summarizes the data.

Comparison example 1—D

In order to compare the durability of the copolymer containing perfluoropolyether with the conventional poly dimethyl siloxane (PDMS), SYLLOF 23 (Dow Corning) (30% in Toluene) was mixed with SYLLOF 23A (Dow Corning) in a ratio of 10 to 1 and the solution viscosity was adjusted to achieve a solids content of 10%. This solution was coated on the photoconductors (A) and (C) as described in Example 2 and Example 4 with the similar procedure described in Example 3. The photoconductors were baked at 135° C. for 30 minutes to achieve a firm (no finger print detected) coating having thickness of 1.5 μm.

TABLE 10

Cyclic stability in a wet environment

| Sample | Vo(1)/ Vo(10K) | DD(1)/ DD(10K) | Vd(1)/ Vd(10K) | Surface energy (1)/(10K) | Transfer % (1)/(10K) |
|---|---|---|---|---|---|
| (A) with perfluoro copolymer | +580/+595 | 1.3/1.1 | 50/55 | 15/14 | 100/100 |
| (A) with PDMS | +560/+450 | 3/5.2 | 50/25 | 18/60 | 100/40 |
| (C) with perfluoro copolymer | 667/690 | 0.8/0.5 | 6.2/10 | 16/16 | 100/100 |

TABLE 10-continued

Cyclic stability in a wet environment

| Sample | Vo(1)/ Vo(10K) | DD(1)/ DD(10K) | Vd(1)/ Vd(10K) | Surface energy (1)/(10K) | Transfer % (1)/(10K) |
|---|---|---|---|---|---|
| (C) with PDMS | 650/420 | 2/6 | 10/8 | 18/62 | 100/39 |

Figure 2:
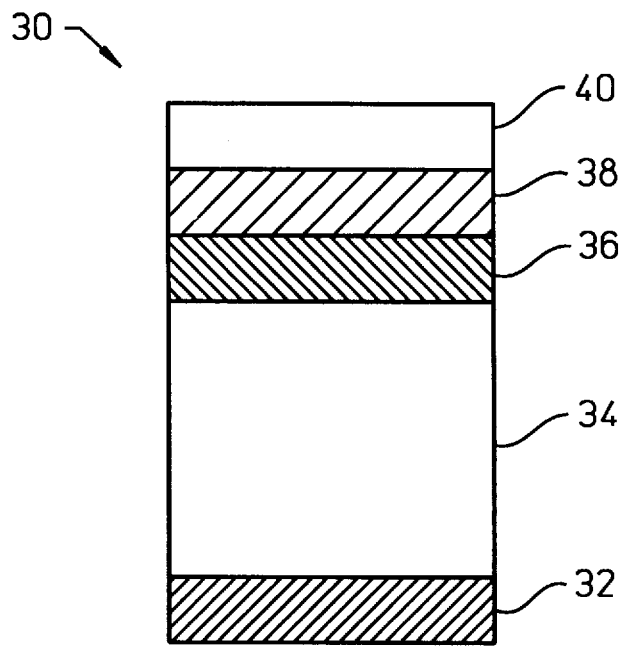
FIG. 2 is a sectional representation of an embodiment of a photoreceptor having a perfluoro copolymer top coating according to the present invention.
Figure 3:
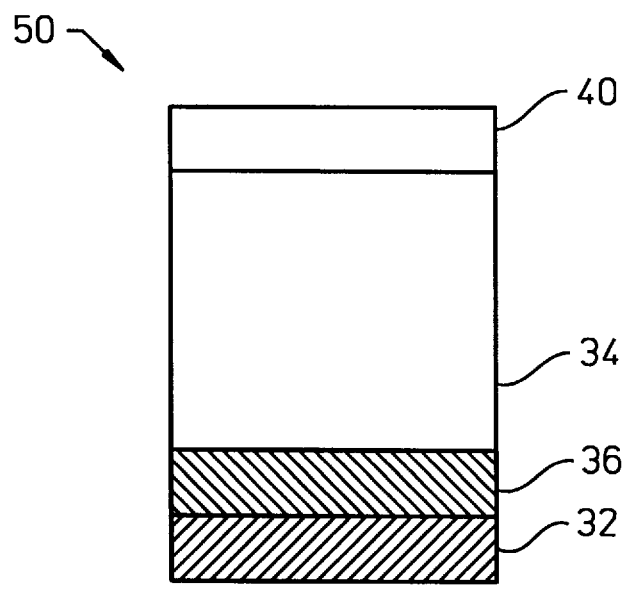
FIG. 3 is a sectional representation of another embodiment of a photoreceptor having a perfluoro copolymer top coating according to the present invention.

Evaluation results (including that in Table 10) indicate that the copolymer having perfluoro polyether in the present invention exhibit good transfer efficiency and is more durable in a liquid development environment than poly dimethyl siloxane. Such copolymers can be used as a top coating in photoreceptors for electrophotographic imaging, whether the charge generation layer is near to or remote from this top coating. For example, in FIG. 2, the photoreceptor 30 has a conductive substrate 32, a charge transport layer (CTL) 34, a charge generation layer (CGL) 36, a charge injection barrier 38, and a perfluoro copolymer top coating 40 connected in that order. In another embodiment shown in FIG. 3, the photoreceptor 50 (without the optional charge injection barrier) has a conductive substrate 32, a charge generation layer 36, a charge transport layer 34, and a perfluoro copolymer top coating 40 connected in that order. The technique of disposing the various layers in an photoreceptor is known in the art. With the disclosure of the present invention on perfluoro copolymer, such photoreceptors can be made readily by those skilled in the art.

Although the illustrative embodiments of the device of the present invention and the method of using the device have been described in detail, it is to be understood that the above-described embodiments can be modified by one skilled in the art without departing from the spirit and scope of the invention.

What is claimed is:

1. A photoconductor coating composition, comprising:

(A) a copolymer which is a polymerization reaction product of reactant monomers comprising:

(a) from 0.1 to 20 mole percent of one or more first monomers on the reactant monomers, the first monomers having the formula

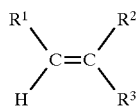

wherein $R^1$, $R^2$ each is selected from the group consisting of hydrogen, halogen, alkyl, phenyl, phenylalkyl, and alkylphenyl in which alkyl has 1 to 4 carbon atoms and is linear, $R^3$ is selected from the group consisting of hydrogen, alkyl, phenyl, phenylalkyl, alkylphenyl, biphenyl, —COOR$^5$, and CONHR$^6$; $R^5$ and $R^6$ each is selected from the group consisting of hydrogen, fluorine, alkyl, fluoroalkyl, chloroalkyl, alkyl, phenyl, phenylalkyl, and alkylphenyl in which alkyl has 1 to 4 carbon atoms and is linear;

(b) from 0.1 to 20 mole percent of one or more second monomers on the reactant monomers, the second monomers having the formula

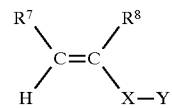

wherein $R^7$, $R^8$ each is selected from the group consisting of hydrogen, alkyl, phenyl, phenylalkyl, and alkylphenyl in which alkyl has 1 to 4 carbon atoms and is linear, X is a bivalent linking group, and Y is selected from the group consisting of —OH, —NCO, —COR (where R is —H, —OH, alkyl, aryl), —NHR (where R is —H, —OH, alkyl, aryl), anhydride group, and epoxy group, (c) from 0.1 to 80 mole percent of one or more third monomers on the reactant monomers, the third monomers being perfluoropolyethers having the formula $Z^1Q^1(CF_2CF_2O)_m(CF_2O)_nQ^2Z^2$ wherein m is from about 1 to about 10,000, n is from 1 to 10,000, $Q^1$, $Q^2$ each is a polyvalent linking group, $Z^1$ and $Z^2$ each has the formula

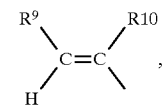

and $R^9$, $R^{10}$ each is selected from the group consisting of hydrogen, alkyl, phenyl, phenylalkyl, and alkylphenyl in which alkyl has 1 to 4 carbon atoms and is linear;

(B) a cross-linking agent, 1% to 30% by weight on the copolymer, selected from the group consisting of cyanate, aldehyde, hydrogen silicone, epoxy, and melamine, for cross-linking the copolymer to form a photoconductor coating;

(C) a solvent 1% to 50% by weight on the copolymer, selected from the group consisting of fluorinated alcohols and fluorinated esters to dissolve the copolymer; such that after curing by cross-linking the copolymer forms a coating having a surface energy of 20 dyne/cm or less and being suitable for a photoconductor.

2. A composition for forming a photoconductor coating, comprising:

(A) a copolymer which is a polymerization reaction product of reactant monomers comprising:

(a) from 0.1 to 20 mole percent of one or more first monomers on the reactant monomers, the first monomers having the formula

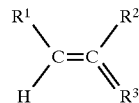

wherein $R^1$, $R^2$ each is selected from the group consisting of hydrogen, halogen, alkyl, phenyl, phenylalkyl, and alkylphenyl in which alkyl has 1 to 4 carbon atoms and is linear, $R^3$ is selected from the group consisting of hydrogen, alkyl, phenyl, phenylalkyl, alkylphenyl, biphenyl, —COOR$^5$, and —CONHR$^6$, $R^5$ and $R^6$ each is selected from the group consisting of hydrogen, fluorine, alkyl, fluoroalkyl, chloroalkyl, alkyl, phenyl, phenylalkyl, and alkylphenyl in which alkyl has 1 to 4 carbon atoms and is linear;

(b) from 0.1 to 20 mole percent of one or more second monomers on the reactant monomers, the second monomers having the formula

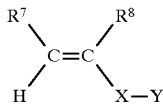

wherein $R^7$, $R^8$ each is selected from the group consisting of hydrogen, alkyl, phenyl, phenylalkyl, and alkylphenyl in which alkyl has 1 to 4 carbon atoms and is linear, X is a bivalent linking group, and Y is selected from the group consisting of —OH, —NCO, —COR (where R is —H, —OH, alkyl, aryl), —NHR (where R is —H, —OH, alkyl, aryl), anhydride group, and epoxy group;

(e) from 0.1 to 80 mole percent of one or more third monomers on the reactant monomers, the third monomers being perfluoropolyethers having the formula $Z^1Q^1(CF_2CF_2O)_m(CF_2O)_nQ^2Z^2$ wherein m is from about 1 to about 10,000, n is from 1 to 10,000, $Q^1$, $Q^2$ each is a polyvalent linking group, $Z^1$ and $Z^2$ each has the formula

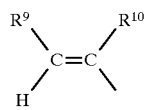

and $R^9$, $R^{10}$ each is selected from the group consisting of hydrogen, alkyl, phenyl, phenylalkyl, and alkylphenyl in which alkyl has 1 to 4 carbon atoms and is linear (B) an effective amount of a cross-linking agent for cross-linking molecules of the copolymer to form a photoconductor coating; and (C) an effective amount of a solvent to dissolve the copolymer; such that after curing by cross-linking the copolymer forms a coating suitable for a photoconductor;

wherein the cross-linking agent is 1% to 30% by weight on the copolymer, selected from the group consisting of cyanate, aldehyde, hydrogen silicone, epoxy, and melamine, for cross-linking the copolymer to form a photoconductor coating.

3. A composition for forming a photoconductor coating, comprising:

(A) a copolymer which is a polymerization reaction product of reactant monomers comprising:

(a) from 0.1 to 20 mole percent of one or more first monomers on the reactant monomers, the first monomers having the formula

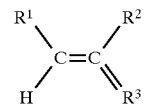

wherein $R^1$, $R^2$ each is selected from the group consisting of hydrogen, halogen, alkyl, phenyl, phenylalkyl, and alkylphenyl in which alkyl has 1 to 4 carbon atoms and is linear, $R^3$ is selected from the group consisting of hydrogen, alkyl, phenyl, phenylalkyl, alkylphenyl, biphenyl, —$COOR^5$, and —$CONHR^6$; $R^5$ and $R^6$ each is selected from the group consisting of hydrogen, fluorine, alkyl, fluoroalkyl, chloroalkyl, alkyl, phenyl, phenylalkyl, and alkylphenyl in which alkyl has 1 to 4 carbon atoms and is linear;

(b) from 0.1 to 20 mole percent of one or more second monomers on the reactant monomers, the second monomers having the formula

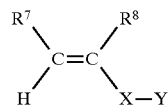

wherein $R^7$, $R^8$ each is selected from the group consisting of hydrogen, alkyl, phenyl, phenylalkyl, and alkylphenyl in which alkyl has 1 to 4 carbon atoms and is linear, X is a bivalent linking group, and Y is selected from the group consisting of —OH, —NCO, —COR (where R is —H, —OH, alkyl, aryl), —NHR (where R is —H, —OH, alkyl, aryl), anhydride group, and epoxy group;

(c) from 0.1 to 80 mole percent of one or more third monomers on the reactant monomers, the third monomers being perfluoropolyethers having the formula $Z^1Q^1(CF_2CF_2O)_m(CF_2O)_nO^2Z^2$ wherein m is from about 1 to about 10,000, n is from 1 to 10,000, $Q^1$, $Q^2$ each is a polyvalent linking group, $Z^1$ and $Z^2$ each has the formula

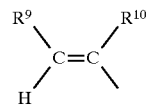

and $R^9$, $R^{10}$ each is selected from the group consisting of hydrogen, alkyl, phenyl, phenylalkyl, and alkylphenyl in which alkyl has 1 to 4 carbon atoms and is linear (B) an effective amount of a cross-linking agent for cross-linking molecules of the copolymer to form a photoconductor coating; and (C) an effective amount of a solvent to dissolve the copolymer; such that after curing by cross-linking the copolymer forms a coating suitable for a photoconductor;

wherein the cross-linking agent is 1% to 30% by weight on the copolymer, selected from the group consisting of cyanate, aldehyde, hydrogen silicone, epoxy, and melamine, for cross-linking the copolymer to form a photoconductor coating; and wherein the solvent is 1% to 50% by weight on the copolymer, selected from the group consisting of fluorinated alcohols and fluorinated esters to dissolve the copolymer.

\* \* \* \* \*